United States Patent [19]

Bächler et al.

[11] 4,023,920

[45] May 17, 1977

[54] TURBOMOLECULAR VACUUM PUMP HAVING A MAGNETIC BEARING-SUPPORTED ROTOR

[75] Inventors: Werner Bächler, Hoffnungsthal; Rüdiger Frank, Cologne, both of Germany; Helmut Habermann, Foret de Vernon Pa; Maurice Brunet, Vernon, both of France

[73] Assignees: Leybold-Heraeus GmbH & Co. KG, Cologne-Bayental, Germany; Societe de Propulsion-S.E.P., Paris, France

[22] Filed: Sept. 26, 1974

[21] Appl. No.: 509,717

[30] Foreign Application Priority Data

Sept. 29, 1973 Germany .......................... 2349033

[52] U.S. Cl. ............... 417/354; 417/424; 417/372; 415/90
[51] Int. Cl.² .................. F04B 35/04; F03B 5/00
[58] Field of Search ............... 417/353, 424 R, 372, 417/420, 354; 308/10; 415/90, 116; 310/62, 63

[56] References Cited

UNITED STATES PATENTS

| | | | |
|---|---|---|---|
| 2,436,939 | 3/1948 | Schug | 308/10 |
| 2,442,019 | 5/1948 | Ray | 415/116 |
| 2,536,824 | 1/1951 | Sontheim | 308/10 |
| 2,557,879 | 6/1951 | Lewis et al. | 417/353 |
| 2,742,223 | 4/1956 | Font | 417/354 |
| 2,772,863 | 12/1956 | Harney et al. | 415/116 |
| 2,809,526 | 10/1957 | Lundberg | 308/10 |
| 3,168,977 | 2/1965 | Garnier et al. | 417/424 X |
| 3,614,181 | 10/1971 | Weeks | 308/10 |
| 3,628,894 | 12/1971 | Ferguson et al. | 417/353 |
| 3,644,067 | 2/1972 | Yowell | 417/372 X |
| 3,650,581 | 3/1972 | Boden et al. | 308/10 |
| 3,698,775 | 10/1972 | Gilbert | 308/10 |
| 3,731,984 | 5/1973 | Habermann | 308/10 |
| 3,749,528 | 7/1973 | Rousseau et al. | 417/424 |

Primary Examiner—Carlton R. Croyle
Assistant Examiner—Thomas I. Ross
Attorney, Agent, or Firm—Spencer & Kaye

[57] ABSTRACT

A turbomolecular vacuum pump has a housing, a vertically oriented hollow pump rotor situated in the housing, and a vertically upwardly oriented stub shaft affixed to the housing and extending into the hollow pump rotor. The pump rotor is supported on the stub shaft by a magnetic axial bearing and at least one magnetic radial bearing, all disposed in the space surrounded by the hollow pump rotor.

6 Claims, 1 Drawing Figure

U.S. Patent May 17, 1977 4,023,920
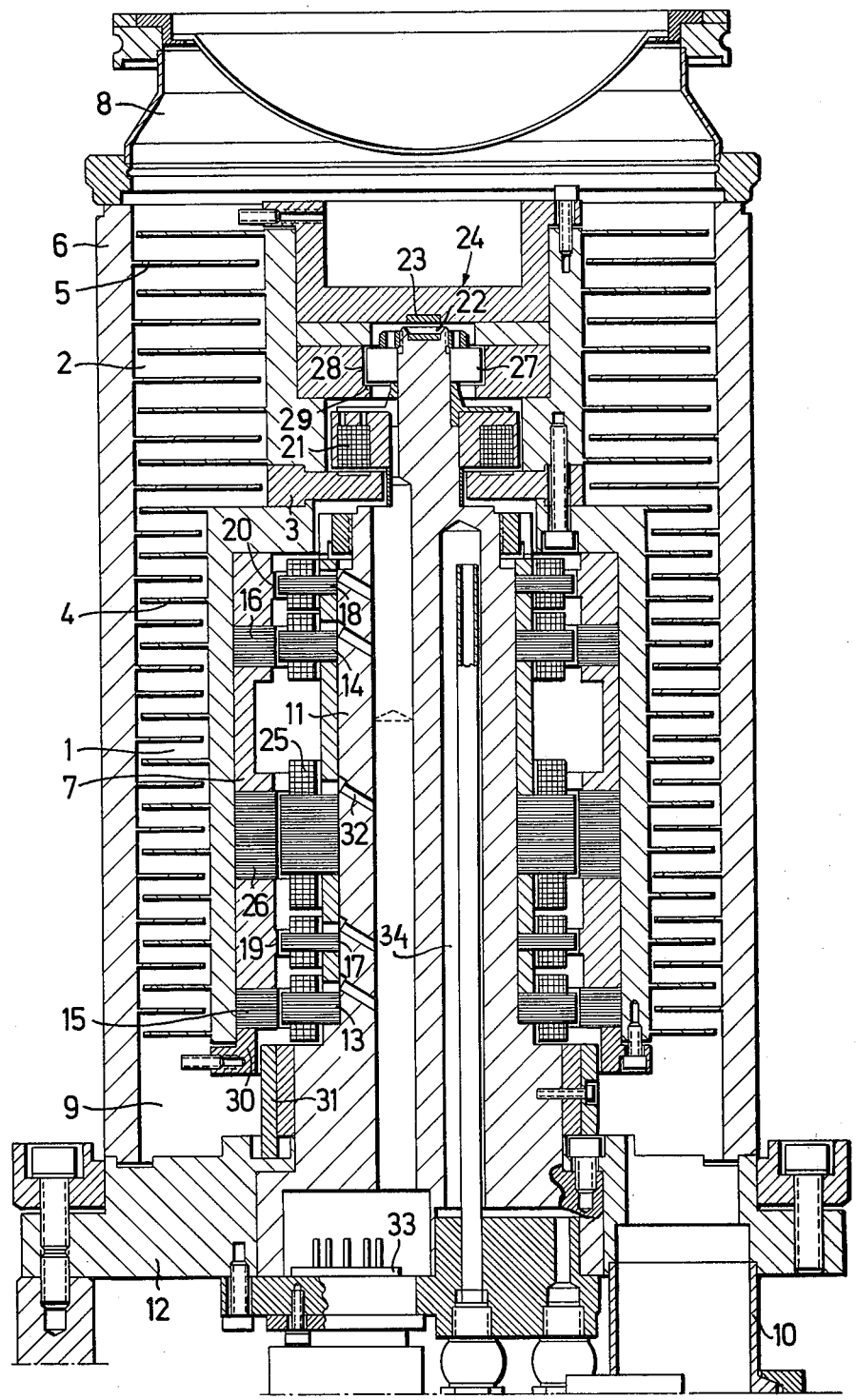

TURBOMOLECULAR VACUUM PUMP HAVING A MAGNETIC BEARING-SUPPORTED ROTOR

BACKGROUND OF THE INVENTION

This invention relates to a turbomolecular vacuum pump which has a vertically oriented rotor supported on a vertically upwardly extending stub shaft affixed to the pump housing. The bearing arrangement of the rotor is situated within the prevacuum chamber surrounded by hollow rotor extends.

For generating a high vacuum that is free from hydrocarbons, several types of turbomolecular vacuum pumps are known. By means of these pumps there may be achieved pressures in the molecular pressure range, that is, approximately between $10^{-2}$ and $10^{-9}$ Torr. In turbomolecular vacuum pumps of this type, particular difficulties have been encountered in the design of the rotor bearing, because of the high-speed rotation amounting to approximately 20,000 rpm.

In known turbomolecular vacuum pumps the rotor is supported on a vertically upwardly oriented stub shaft which is affixed to the housing and which includes oil-lubricated roller bearings with a lubricant (oil) circuit. The bearing arrangement is disposed in the prevacuum chamber of the pump to ensure that during operation, the light fractions of hydrocarbons escaping from the oil because of the oil flow from the high vacuum part to the prevacuum part of the pump, do not enter the high vacuum chamber. During standstill of such a turbomolecular vacuum pump, however, there is no directed flow which would prevent the return of the hydrocarbons into the high vacuum chamber. Thus the undesirable possibility is present that these hydrocarbons are introduced by diffusion from the prevacuum chamber into the high vacuum chamber. The penetration of the hydrocarbons into the vacuum chamber and thus, at the same time, their penetration into the high vacuum receptacles connected with the high vacuum chamber of the turbomolecular pump must not be permitted in many cases, particularly when the pump is used in physical research or the like. Consequently, the use of such known turbomolecular vacuum pumps is limited.

For avoiding the above-outlined disadvantages, turbomolecular vacuum pumps have been developed in which, by using a lubricating oil having a particularly low vapor pressure, a hydrocarbon diffusion from the roller bearing is largely prevented. The suppression of back-flow of the hydrocarbons into the high vacuum chamber is, however, insufficient for some applications.

It is further in the domain of the prior art to provide a lubricant-free magnetic bearing for the rotor in which a magnetic axial bearing is situated in the high vacuum chamber and in the suction chamber of the turbomolecular pump, thus constricting the free suction section of the pump. For a radial support of the stator, there is disposed a radial bearing beneath the turbine formed of a rotor and a stator. Although such an arrangement results in a hydrocarbon-free high vacuum, the provision of a magnetic axial bearing at the high vacuum side proved to be disadvantageous in connection with the supply of electric energy, the heatup of the coils and thus the provision of the possibility of release of gases and the like. It was further found that the arrangement of an upper axial bearing in connection with only one radial bearing disposed beneath the turbine cannot ensure all degrees of freedom for the rotor. The known magnetic bearing thus displays, besides disadvantages relating to vacuum technology, instabilities of rotor motion including precessional and nutational motions. Further, this known arrangement does not provide a satisfactory emergency bearing. The latter should be a mechanical bearing (as opposed to a magnetic bearing), expediently in the form of a slide bearing which, in case of a malfunctioning of the magnetic bearing (caused, for example, by power failure), ensures a smooth stoppage of the rotor without the danger of damage or destruction.

SUMMARY OF THE INVENTION

It is an object of the invention to provide a turbomolecular vacuum pump with which a hydrocarbon-free high vacuum can be generated, in which the magnetic bearing arrangement for the rotor is designed for a stable run of the rotor and which provides for an emergency bearing in a favorable overall pump design from the point of view of high vacuum technology for ensuring a smooth stoppage of the rotor in case of a malfunctioning of the magnetic bearing.

These objects and others to become apparent as the specification progresses, are accomplished by the invention, according to which, briefly stated, the rotor is supported on the stub shaft by a magnetic axial bearing and at least one magnetic radial bearing which are disposed in the space surrounded by the rotor.

In an arrangement outlined above, all magnetic bearings are expediently disposed on the prevacuum side, in the space surrounded by the rotor. Electric current may be supplied in a simple manner through the hollow space of the stationary vertical stub shaft, so that at the stub shaft there are arranged those components of the magnetic bearing which require the current-carrying coils. On the rotor, on the other hand, there are arranged only ferromagnetic bearing components which do not require the supply of current.

A significant advantage of arranging all the magnetic bearings in the space (prevacuum chamber) surrounded by the hollow pump rotor resides in the fact that the suction chamber at the high vacuum side of the pump is no longer obstructed by bearing components. In this manner there is achieved a substantial decrease in the suction resistance of the turbomolecular vacuum pump which enhances low suction pressures and thus long free travelling paths for the gas molecules. The magnetic bearing arrangement for the pump rotor makes possible the suppression of precessional and nutational oscillations even in upper harmonics and it is further made possible that the rotor in fact rotates about its principal axis of inertia, resulting in a completely vibration-free run of the pump rotor. Such complete freedom from vibration signifies an important improvement as compared to known turbomolecular vacuum pumps having roller bearings or magnetic bearings. Thus, the turbomolecular vacuum pump designed according to the invention transmits no vibration from the vacuum pump system to the vacuum receptacles connected therewith. Consequently, a turbomolecular vacuum pump designed in accordance with the invention may be used in research relating to special problems of surface physics where, because of the highly sensitive, optical observation instruments, any transmission of motion to the high vacuum receptacles must be avoided. Further, in the turbomolecular vacuum pump according to the invention there can be achieved a hydrocarbon-free high vacuum even at standstill of the pump.

BRIEF DESCRIPTION OF THE DRAWING

The sole FIGURE illustrates, in axial section, a turbomolecular vacuum pump incorporating a preferred embodiment of the invention.

DESCRIPTION OF THE PREFERRED EMBODIMENT

The turbomolecular vacuum pump illustrated in the Figure is formed of two turbine halves 1, 2 which are connected to one another by means of a flange 3 made of ferromagnetic material. Between stator stages 5 held by a centering sleeve 6 there extend rotor stages 4 of a pump rotor 7. The gas to be pumped out is drawn through a suction channel 8 and subsequent to corresponding compression in the cooperating rotor and stator stages which are bladed in a turbine-like manner, the gas is collected in a prevacuum chamber 9 from which it is led to the prepumping unit through a prevacuum nipple 10.

Into the hollow space defined by the pump rotor 7 there extends a stub shaft 11 which is rigidly affixed to the vacuum pump housing (only a fragment of the housing is shown) by means of a lower support flange 12. On the stub shaft 11 there are arranged the respective stators 13 and 14 of a lower and an upper magnetic radial bearing. Facing these stators are the respective bearing rotors 15, 16 which are affixed to the pump rotor 7. In the same manner, there are provided a lower radial bearing sensor 17 and an upper radial bearing sensor 18 with respective running parts 19, 20. The sensors 17 and 18 are arranged between the stub shaft 11 and the turbine half 1. There is further provided a magnetic axial bearing formed by an armature coil 21 inserted on the upper part of the stub shaft 11 and by the ferromagnetic intermediate flange 3. An axial bearing sensor 22 is provided at the upper end of the stub shaft 11, while a counterpiece 23 is embedded in a rotor closure plate 24. It is noted that instead of the illustrated bearing sensors of the magnetic type, photoelectric bearing sensors may, in some instances, also be used. Magnetic bearing sensors associated with magnetic bearings are well known in the art: they control the exciting current of the magnetic bearing as a function of the sensed position of the rotary member supported by the magnetic bearing. Such a magnetic bearing sensor with the associated control circuit is disclosed, for example, in U.S. Pat. to Habermann, No. 3,731,984.

The motor drive of the pump rotor 7 is located between the upper magnetic radial bearing arrangement 14, 16, 18, 20 and the lower magnetic radial bearing arrangement 13, 15, 17 and 19. The drive motor for the pump rotor 7 is of the outer rotor type. It comprises a stator coil 25 affixed to the stub shaft 11 and a rotor component 26 affixed to the pump rotor 7. The electromotor 25, 26 operates on the principle of a short-circuited rotor. It is feasible, however, to provide other types of drive motors, for example, hysteresis motors in which the rotor 26 is constituted by a cylinder made of hysteresis material.

The emergency bearing of the turbomolecular vacuum pump is constituted by an upper roller bearing 27 (which is both a radial and an axial bearing) cooperating with runner faces 28, 29 and a lower radial bearing with runner rings 30, 31. Instead of the roller bearing 27, there may be used a pair of roller bearings with roller bearings urged to one another with a bias. In case of a malfunctioning of the magnetic bearing arrangement, the pump rotor 7 engages the upper roller bearing 27 and is thus axially and radially supported thereby. The radial support is reinforced by a short-period engagement of the runner rings 30 and 31 with one another.

Since the emergency bearing is operative only rarely, in exceptional cases, no continuous lubrication or lubricating circuit is needed therefor. It is thus sufficient if the roller bearing 27 merely has properties necessary for an emergency run; this may be accomplished in a known manner by providing the bearing 27, for example, with a lead-bronze coating.

The electric conductors leading to the coils arranged on the stub shaft 11 are disposed in supply ports 32 provided in the stub shaft 11. By means of a current lead-through coupling 33, an electric connection may be established between the prevacuum chamber and a current source situated externally of the turbomolecular vacuum pump.

The pump rotor 7, in the zones of the drive motor and the magnetic bearings, may be formed of axially extending laminated portions to constitute the magnetic bearing rotors or the rotor of the drive motor, as the case may be. The laminae in each laminated rotor portion are insulated from one another.

For releasing the heat generated in the stub shaft 11, the latter is provided with a cooling channel 34. The cooling effect of the cooling channel 34 is substantial because, due to the surrounding vacuum, there is no sufficient possibility of heat release by convection and because heat exchange by direct contact in certain cases is not sufficient for preventing an undesirable heatup of the stub shaft 11. In certain cases a gas or liquid coolant may be circulated in a closed cooling channel 34.

The circuitry of the individual components and particularly the cooperation of the sensors with the magnetic bearings is effected in accordance with known arrangements.

A turbomolecular vacuum pump incorporating the characteristics of the invention provides a superior magnetic support of the pump rotor without obstructing the high-vacuum suction chamber and further makes possible a stable run of the rotor. By means of the emergency bearing there is avoided damage to the turbomolecular vacuum pump in case of an electric power failure.

It will be understood that the above description of the present invention is susceptible to various modifications, changes and adaptations, and the same are intended to be comprehended within the meaning and range of equivalents of the appended claims.

We claim:

1. In a turbomolecular vacuum pump including a pump housing; a vertically oriented hollow pump rotor situated in the housing; a vertically upwardly oriented stub shaft affixed to the pump housing and extending into the space surrounded by the hollow pump rotor; the improvement comprising:
    a. a magnetic axial bearing disposed within said space and mounted on said stub shaft and said pump rotor for effecting support of said pump rotor by said stub shaft;
    b. two magnetic radial bearings disposed within said space and mounted on said stub shaft and said pump rotor for effecting support of said pump rotor by said stub shaft, said magnetic radial bearings being mounted spaced from one another along said stub shaft;

c. all magnetic bearings effecting support of said pump rotor by said stub shaft being disposed entirely within said space; and d. an electric drive motor being disposed within said space between said two magnetic radial bearings; said electric drive motor having a motor stator coil mounted on said stub shaft and an outer rotor surrounding said motor stator coil and being connected to said pump rotor.

2. A turbomolecular vacuum pump as defined in claim 1, said two magnetic radial bearings being situated at a distance below said magnetic axial bearing, the improvement further comprising a plurality of magnetic bearing sensors, one disposed in the zone of each of the magnetic bearings; each magnetic bearing sensor being operatively connected to the associated magnetic bearing for controlling the latter in response to the magnitudes sensed by the magnetic bearing sensor.

3. A turbomolecular vacuum pump as defined in claim 1, further comprising a mechanical emergency bearing mounted on said stub shaft and said pump rotor.

4. A turbomolecular vacuum pump as defined in claim 3, said emergency bearing including a roller bearing for taking up axial and radial thrusts and a runner ring attached to said pump rotor, said runner ring functioning as a radial bearing.

5. A turbomolecular vacuum pump as defined in claim 1, wherein said pump rotor has axial portions formed of laminae, said axial portions being located in the zone of said drive motor, said magnetic axial bearing and said two magnetic radial bearings.

6. A turbomolecular vacuum pump as defined in claim 1, further comprising means defining a cooling channel in said stub shaft.

* * * * *